United States Patent Office 3,527,849
Patented Sept. 8, 1970

3,527,849
DITHIOPHOSPHATES AND DITHIOPHOSPHONATES HAVING AN S-(TERT.-BUTOXY CARBONYL METHYL) GROUP
Noboru Shindo, Yasukazu Ura, and Hiroki Takahashi, all c/o Nissan Kagaku Kogyo K.K., Kenkyusho, 1 of No. 4 5-chome, Toshima, Kita-ku, Tokyo, Japan, and Mitsuru Hayakawa, Mamoru Hayashi, and Hiroharu Nakadai, all c/o Nissan Kagaku Kogyo K.K., Kenkyusho Noji Shikenjo, 1470 Ohaza-Shiraoka, Shiraokamachi, Minamisaitama-gun, Saitama-ken, Japan
No Drawing. Filed July 12, 1965, Ser. No. 471,448
Claims priority, application Japan, July 15, 1964, 39/39,775; July 20, 1964, 39/40,457
Int. Cl. C07f 9/16; A01n 9/36
U.S. Cl. 260—941                               6 Claims

ABSTRACT OF THE DISCLOSURE

Compounds having insecticidal activity and having the following formulae

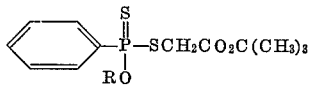

or

wherein R represents lower alkyl.

---

This invention relates to the insecticidal compositions characterized in that the essential component is one or more of organophosphonate (I) or organophosphate (II) having the general formula

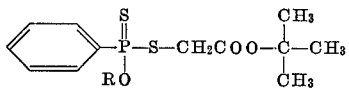          (I)

or

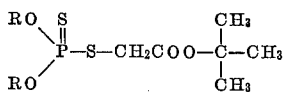          (II)

wherein R represents lower alkyl group.

The object of the present invention is to provide the novel useful insecticidal compositions of organophosphonate or organophosphate which have the higher insecticidal activity and the lower toxicity to mammalia.

The insecticides which comprises a compound having the following general formula

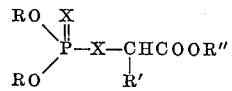

wherein R represents an alkyl group, R′ phenyl group, alkyl group or hydrogen, R″ is straight alkyl group, X represents oxygen or sulfur in which at least one atom indicates sulfur atom, has been provided by the present inventors.

The present inventors carried further investigations to elucidate the activities of the similar compounds, and found that a compound having a tertiary butyl group in the carboxylester has remarkably increased activity compared with a compound having straight chain alkyl group such as methyl or ethyl group in the carboxylester of above described formula.

The esters having tertiary butyl group as alkyl group is more stable against hydrolysis than the esters having ethyl or methyl group and consequently this compound does not show any tendency of deactivation.

The compounds used in this invention can be easily prepared by the following reaction

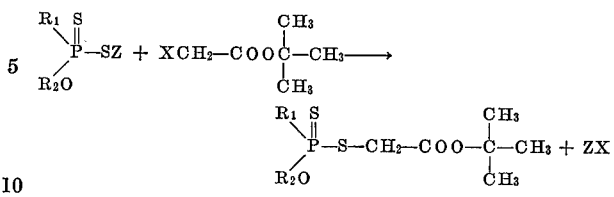

wherein $R_1$ is phenyl or lower alkoxy group, $R_2$ is lower alkyl group, Z is alkali metal or ammonium radical, and X is halogen.

The examples of compounds to be used in the present invention includes following compounds:

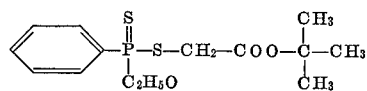

o-Ethyl-S-(tert.-butoxy carbonyl methyl)benzene dithio phosphonate

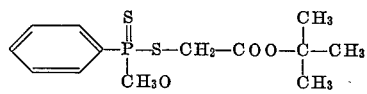

o-Methyl-S-(tert.-butoxy carbonyl methyl)benzene dithiophosphonate

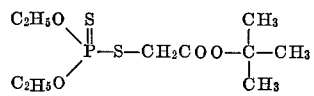

o,o-Diethyl-S-(tert.-butoxy carbonyl methyl)dithiophosphate

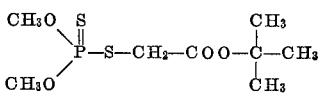

o,o-Dimethyl-S-(tert.-butoxy carbonyl methyl)dithiophosphate

The organophosphorus insecticide of the present invention can be mixed with diluent or solvent such as bentonite, clay, talc, xylene and benzene and any suitable additive such as surface active agents and others. Thus the present composition can be applied as dust, emulsifiable concentrate, granules, wettable powder and the others.

Further, the insecticidal compositions of the present invention may be used together with any other insecticides, fungicides, herbicides, fertilizers and the others.

The activities of the compositions of the present invention are determined as follows:

TEST 1

Insecticidal tests for the house fly (*Musca domestica* Linné)

The adult female house flies (*Musca domestica* Linné) of three to five days old after emergence were used in this test. After anesthetizing with carbondioxide gas, 1 ml. of acetone solution of the following organophosphate was topically applied on the corselet and back, and they were reared with sucrose aqueous solution in cage at 250 C. The mortality were determined after forty-eight hours. From the mortality accounts obtained here, medial lethal dose ($LD_{50}$) was calculated according to the Finney's graphic method.

| Compound | No. of insects used | $LD_{50}$, µg/.g. |
|---|---|---|
| $C_6H_5$–P(=S)(OC_2H_5)–S–CH_2–COO–C(CH_3)_3 | 200 | 8.8 |
| $C_6H_5$–P(=S)(OCH_3)–S–CH_2–COO–C(CH_3)_3 | 200 | 13 |
| (C_2H_5O)_2–P(=S)–S–CH_2–COO–C(CH_3)_3 | 200 | 2.6 |
| (CH_3O)_2–P(=S)–S–CH_2–COO–C(CH_3)_3 | 200 | 5.4 |
| Control: | | |
| $C_6H_5$–P(=S)(OC_2H_5)–S–CH_2–COO–CH_3 | 200 | 530 |
| $C_6H_5$–P(=S)(OCH_3)–S–CH_2–COOCH_3 | 200 | 120 |
| $C_6H_5$–P(=S)(OC_2H_5)–S–CH_2–COOC_2H_5 | 200 | 214 |
| $C_6H_5$–P(=S)(OCH_3)–S–CH_2–COOC_2H_5 | 200 | 150 |
| (C_2H_5O)_2–P(=S)–S–CH_2–COOC_2H_5 | 200 | 16 |
| (H_3O)(CH_3O)–P(=S)–S–CH_2–COOC_2H_5 (CH_3O/CH_3O) | 200 / 200 | 43 / 43 |

TEST 2

Isecticidal tests for the mature larvae of Almond moth (*Ephestia cautella*)

Each 1 ml. of the 1% and 0.1% acetone solution of the said organophosphonate or organophosphate were placed into each dish (9 ml.) and acetone was evaporated up at the room temperature. Ten adult larvae of Almond moth (*Ephestia cautella*) were reared in each dish at 25° C. The mortality were determined after forty-eight hours. Each two dishes were used for each same concentration.

| Compound | Percent Concentration | Mortality |
|---|---|---|
| $C_6H_5$–P(=S)(OC_2H_5)–S–CH_2–COO–C(CH_3)_3 | 1 / 0.1 | 60 / 10 |
| $C_6H_5$–P(=S)(OCH_3)–S–CH_2–COO–C(CH_3)_3 | 1 / 0.1 | 55 / 30 |
| (C_2H_5O)_2–P(=S)–S–CH_2–COO–C(CH_3)_3 | 1 / 0.1 | 80 / 55 |
| (CH_3O)_2–P(=S)–S–CH_2–COO–C(CH_3)_3 | 1 / 0.1 | 100 / 50 |
| Control: | | |
| $C_6H_5$–P(=S)(OC_2H_5)–S–CH_2–COO–CH_3 | 1 / 0.1 | 15 / 0 |
| $C_6H_5$–P(=S)(OC_2H_5)–S–CH_2–COO–C_2H_5 | 1 / 0.1 | 35 / 0 |
| (C_2H_5O)_2–P(=S)–S–CH_2–COO–C_2H_5 | 1 / 0.1 | 50 / 10 |

TEST 3

Insecticidal tests for the adults of Green Rice Leafhopper (*Nephotettix bipunctatus cincticeps*)

To thirty parts of the said organophosphonate or organophosphate were added fifty parts of xylene, twenty parts of "Sorpol AC-2175" emulsifier (Toho Chem. Co., Ltd.). The resulting emulsifiable concentrate was diluted with water to prepare 0.005% emulsion of said organophosphonate or organophosphate. After treating rice seedlings by dipping in the solution for 10 sec., the plants were kept and dried in air atmosphere at room temperature. The air-dried seedlings thus obtained were placed about 20 of green rice hopper in each glass cylinder. After keeping at 25° C. for twenty-four hours, the mortality were tested. Two glass cylinders were used for each compound.

| Compound | Percent Concentration | Mortality |
|---|---|---|
| $C_6H_5$–P(=S)(OC_2H_5)–S–CH_2–COO–C(CH_3)_3 | 0.005 | 97 |
| $C_6H_5$–P(=S)(OCH_3)–S–CH_2–COO–C(CH_3)_3 | 0.005 | 100 |
| (C_2H_5O)_2–P(=S)–S–CH_2–COO–C(CH_3)_3 | 0.005 | 82 |
| (CH_3O)_2–P(=S)–S–CH_2–COO–C(CH_3)_3 | 0.005 | 54 |
| Control: | | |
| (C_2H_5O)_2–P(=S)–S–CH_2–COO–C_2H_5 | 0.005 | 0 |
| $C_6H_5$–P(=S)(OCH_3)–S–CH_2–COOCH_3 | 0.005 | 14 |

TABLE—Continued

| Compound | Percent Concentration | Mortality |
|---|---|---|
| (phenyl)(CH₃O)P(S)—S—CH₂—COOC₂H₅ | 0.005 | 0 |
| (C₂H₅O)₂P(S)—S—CH₂—COOC₂H₅ | 0.005 | 0 |
| (CH₃O)₂P(S)—S—CH₂—COOC₂H₅ | 0.005 | 12 |

TEST 4

Toxicity tests against mice

To fifty parts of organophosphonate or organophosphate were added thirty parts of xylene and twenty parts of "Sorpol AC-2175" emulsifier. The resulting emulsifiable concentrate was diluted with water. Male mice d-d-species (about 20 g. of body weight) were used. The emulsifying aqueous solution containing 50 mg. of the said organophosphonate or organophosphate was orally administered. After forty-eight hours, the mortality were estimated.

| Compound | No. of mice Tested | Mortality |
|---|---|---|
| (phenyl)(C₂H₅O)P(S)—S—CH₂COO—C(CH₃)₃ | 10 | 0 |
| (phenyl)(CH₃O)P(S)—S—CH₂COO—C(CH₃)₃ | 10 | 0 |
| (C₂H₅O)₂P(S)—S—CH₂COO—C(CH₃)₃ | 10 | 0 |
| (CH₃O)₂P(S)—S—CH₂COO—C(CH₃)₃ | 10 | 0 |

As seen in the tables, the data show that the organophosphates having tertiary butyl group in ester has always increased insecticidal activities, whereas the activities of the corresponding ethylester or methylester were extremely lower. Furthermore above tests showed that toxicity of the tertiarybutyl ester to mammalia is always lower than any lower alkylester such as ethylester or methylester.

The preparations of the said insecticidal composition are described as follows:

Example 1.—Emulsifiable concentrate

|  | Parts |
|---|---|
| o-Ethyl-S-(tert.-butoxy carbonyl methyl) benzene dithiophosphonate | 50 |
| Xylene | 30 |
| Emulsifier "Sorpol AC-2175" (Toho Chem. Co., Ltd.) | 20 |

The above materials are completely mixed to obtain emulsifiable concentrate which are used after dilution with water.

Example 2.—Wettable powder

|  | Parts |
|---|---|
| o-Methyl-S-(tert.-butoxy carbonyl methyl)benzene-dithiophosphonate | 20 |
| Emulsifier "Lunocks 1000C" (Toho Chem. Co., Ltd.) | 10 |
| Clay | 70 |

The above materials are mixed and the mixture completely pulverized to produce the wettable powder. The product obtained here is diluted with water to serve for application.

Example 3.—Dusts

|  | Parts |
|---|---|
| o,o-Diethyl-S-(tert.-butoxy carbonyl methyl)dithio phosphate or o-ethyl-S-(tert.-butoxy carbonyl methyl)-benzene-dithiophosphonate | 2 |
| Talc | 98 |

The above materials are mixed uniformly and pulverized. The dust product obtained here is served in the form as it is for a purpose.

Example 4.—Granules

|  | Parts |
|---|---|
| o,o-Dimethyl-S-(tert.-butoxy carbonyl methyl)-dithiophosphate or o-Methyl-S-(tert.-butoxy carbonyl methyl)benzenedithiophosphonate | 5 |
| Bentonite | 95 |

The above materials are mixed uniformly with small amount of water and completely pulverized and then pelletized by means of extruding pelletizer and dried.

What we claim are:

1. A compound having the following formula

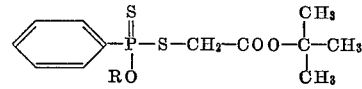

wherein R represents a lower alkyl group.

2. A compound having the following formula as

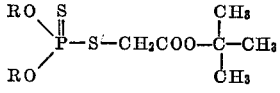

wherein R represents a lower alkyl group.

3. Phosphoric esters of the formula:

$$(RO)_2P(S)-S-CH_2-CO_2C(CH_3)_3$$

wherein R represents methyl or ethyl.

4. The phosphoric ester according to claim 3 wherein R represents ethyl.

5. Phosphoric esters of the formula:

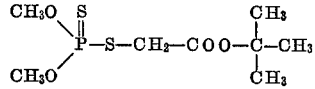

6. A phosphoric ester of the formula:

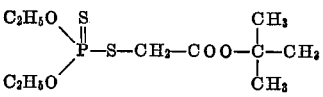

References Cited

UNITED STATES PATENTS 3,284,547   11/1966   Metivier _____ 260—941

CHARLES R. PARKER, Primary Examiner

A. H. SUTTO, Assistant Examiner

U.S. Cl. X.R.

260—978; 424—212